US008780863B2

(12) United States Patent
Cheng et al.

(10) Patent No.: US 8,780,863 B2
(45) Date of Patent: Jul. 15, 2014

(54) SYSTEMS AND METHODS FOR CONTROL CHANNEL TRANSMISSION AND RECEPTION

(75) Inventors: Qiang Cheng, Aurora, IL (US); Bingyu Qu, Schaumburg, IL (US); Xiang Chen, Lake Zurich, IL (US)

(73) Assignee: Futurewei Technologies, Inc., Plano, TX (US)

( * ) Notice: Subject to any disclaimer, the term of this patent is extended or adjusted under 35 U.S.C. 154(b) by 185 days.

(21) Appl. No.: 13/286,875

(22) Filed: Nov. 1, 2011

(65) Prior Publication Data

US 2013/0107861 A1 May 2, 2013

(51) Int. Cl.
*H04W 72/04* (2009.01)
*H04W 36/00* (2009.01)

(52) U.S. Cl.
USPC .......................................... 370/331; 370/329

(58) Field of Classification Search
USPC .................................................. 370/260–332
See application file for complete search history.

(56) References Cited

U.S. PATENT DOCUMENTS

2008/0225786 A1* 9/2008 Han et al. ...................... 370/329
2010/0014473 A1* 1/2010 Ofuji et al. .................... 370/329
2010/0091739 A1* 4/2010 Dayal et al. ................... 370/332
2010/0120442 A1* 5/2010 Zhuang et al. ................ 455/450
2010/0220675 A1* 9/2010 Chun et al. .................... 370/329
2011/0044391 A1* 2/2011 Ji et al. .......................... 375/260
2011/0141928 A1* 6/2011 Shin et al. ...................... 370/252
2012/0269295 A9* 10/2012 Ko et al. ........................ 375/299
2013/0107816 A1* 5/2013 Iraji et al. ...................... 370/329

OTHER PUBLICATIONS

"$3^{rd}$ Generation Partnership Project; Technical Specification Group Radio Access Netwok; Evolved Universal Terrestrial Radio Access (E-UTRA); LTE physical layer; General description (Release 10)," 3GPP TS 36.201, V10.0.0, Dec. 2010, 13 pages.
"$3^{rd}$ Generation Partnership Project; Technical Specification Group Radio Access Netwok; Evolved Universal Terrestrial Radio Access (E-UTRA); Physical Channels and Modulation (Release 10)," 3GPP TS 36.211, V10.3.0, Sep. 2011, 103 pages.
Ericsson, "Enhancements for UE specific control signaling," 3GPP TSG-RAN WG1 #65, R1-111332, May 9-13, 2011, 3 pages, Barcelona, Spain.
Huawei, "Investigation on downlink control channel and signaling enhancements," 3GPP TSG RAN WG1 meeting #65, R1-111253, May 9-13, 2011, 3 pages, Barcelona, Spain.

* cited by examiner

*Primary Examiner* — Un C Cho
*Assistant Examiner* — Fangyan Deng
(74) *Attorney, Agent, or Firm* — Slater & Matsil, L.L.P.

(57) ABSTRACT

In one embodiment, a method for wireless communication includes receiving a channel feedback information from a user equipment at a base station. A control channel is allocated in a data region of a subframe as indicated by the channel feedback information. The control channel within the subframe is transmitted to the user equipment.

38 Claims, 11 Drawing Sheets

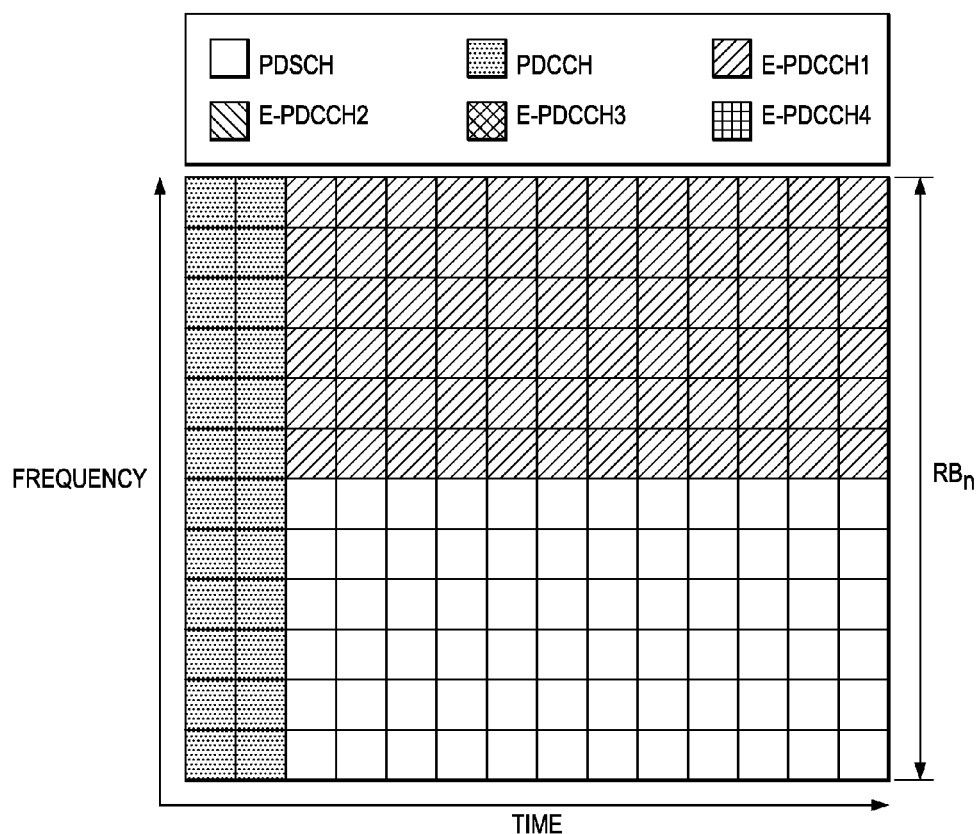

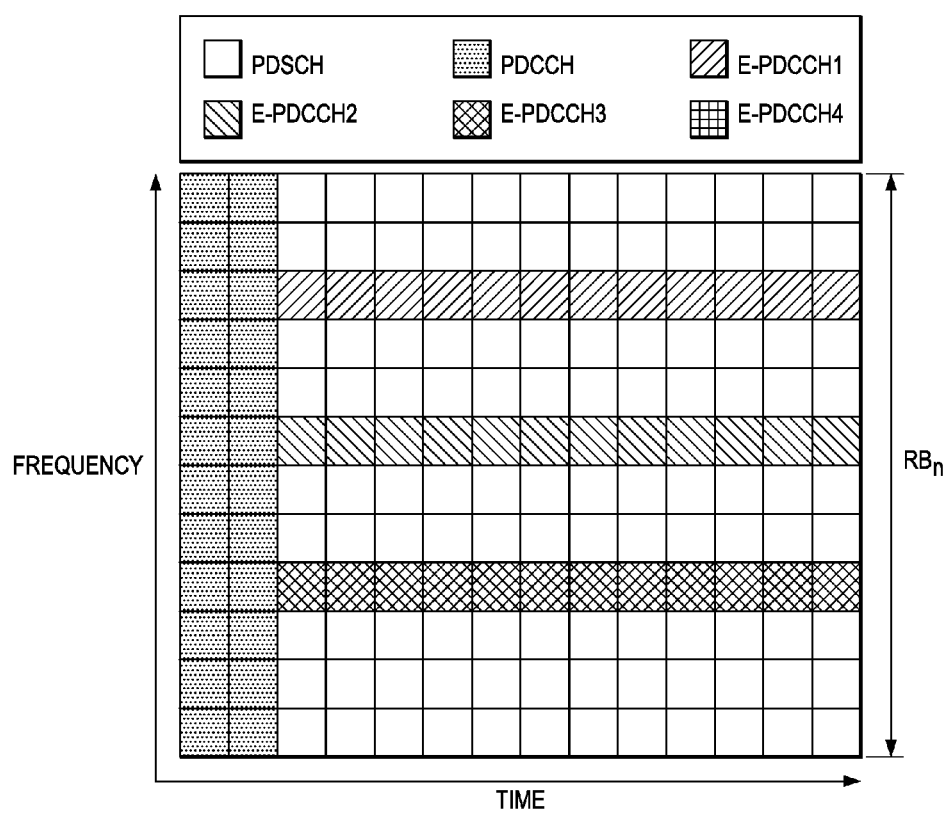

SYSTEMS AND METHODS FOR CONTROL CHANNEL TRANSMISSION AND RECEPTION

TECHNICAL FIELD

The present invention relates generally to wireless communications, and more particularly to a methods and systems for control channel transmission and reception.

BACKGROUND

The use of wireless devices, such as cellular telephones, laptops, PDAs, and the like, have exploded over the last couple decades in both the consumer market as well as the business market. Generally, wireless devices include a transceiver and communicate with other transceivers using a variety of communication protocols. For example, Wi-Fi networks are popular in homes and business and provide a user of a compatible device wireless access to the internet. WiFi networks are based on the IEEE 802.11 standard and provide short range connectivity. Many wireless devices are also compatible with one or more cellular networks to provide broader, longer range coverage. For example, many wireless devices communicate wirelessly to networks utilizing a Global Systems for Mobile Communications (GSM) or Code Division Multiple Access (CDMA) standard.

These communications standards used by wireless devices are constantly evolving to provide greater services, including new features as well as better service. For example, the current standard being developed by the $3^{rd}$ Generation Partnership Project (3GPP) is the Long Term Evolution (LTE) standard. LTE is often marketed in the United States as "4G" and is often the subject of marketing campaigns by service providers. LTE is designed to provide greater throughput and higher speeds for users as well as providing a simpler architecture resulting in lower operating costs for service providers.

One of the bottlenecks in present LTE architecture relates to the design of the control channel. The capacity of the control channel in current downlink (DL) control channel designs is related to the number of available CCEs (control channel element) and the aggregation level assigned to each allocated control channel. Since the control channel region is restricted to e.g., three OFDM symbols, the base station may run out of resources for the transmission of control channel. Advances in LTE require implementation of flexible control channels that may be adapted to improve the capacity of the control channels and mitigate potential interference on the control channels.

SUMMARY OF THE INVENTION

These and other problems are generally solved or circumvented, and technical advantages are generally achieved, by illustrative embodiments of the present invention.

In accordance with an embodiment of the present invention, a method for wireless communication comprises allocating a first control channel in a first data region of a first subframe based on a first channel feedback information from a first user equipment at a first base station. The first control channel is multiplexed with a first data channel in the first data region. The first control channel may be multiplexed with the first data channel using a frequency division, a time division, a spatial division, or a hybrid division multiplexing scheme. The method further comprises transmitting the first subframe comprising the first control channel to the first user equipment.

In accordance with another embodiment of the present invention, a method for wireless communication comprises receiving a first reference signal from a first base station at a first user equipment. Based on the first reference signal, channel quality indicator feedback information is generated and transmitted. A first search space for control channel candidates is generated based on the channel quality feedback information. The first search space comprises potential location of a control channel in a data region of a received subframe. A first subframe is received from the first base station.

In accordance with an embodiment of the present invention, a network component comprises an allocator, a receiver, and a transmitter. The allocator is configured to allocate a first control channel in a first data region of a first subframe based on a first channel feedback information from a first user equipment. The allocator is configured to allocate the first control channel as being frequency division multiplexed with a first data channel in the first data region. The receiver is configured to receive the first channel feedback information from the first user equipment. The transmitter is configured to transmit the first subframe comprising the first control channel to the first user equipment.

In accordance with an embodiment of the present invention, a wireless device comprises a receiver, a first generator, a transmitter, and a second generator. The receiver is configured to receive a first reference signal and to receive a subframe from a first base station. The first generator is configured to generate a channel quality feedback information based on the first reference signal. The transmitter is configured to transmit the channel quality feedback information. The second generator is configured to generate a first search space for control channel candidates. The second generator is configured to generate the first search space based on the channel quality feedback information. The first search space comprises potential location of a control channel in a data region of a received subframe.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2, which includes FIGS. 2a-2e, illustrates resource allocation for an enhanced control channel in a data region of a radio subframe using embodiments of the invention;

FIGS. 7A and 7B, illustrates an embodiment of the invention applied to UE mobility across multiple cells or multiple base stations;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
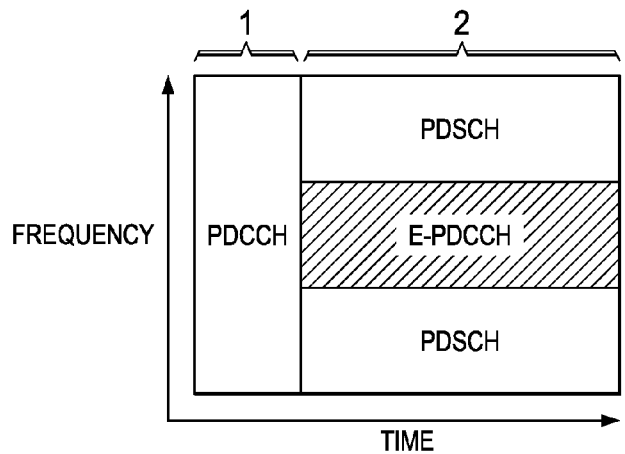
FIG. 1 illustrates the location of an enhanced control channel in a subframe.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Specific embodiments are described using the words user equipment (UE) and base station (eNodeB). Other commonly used and typically interchangeable terms for UE may include mobile station, user, terminal, access terminal, subscriber, and so forth, while controller, base station, base terminal station, and so on, may be commonly used terms for eNodeB.

Downlink and uplink transmissions are organized into radio frames. Radio frames are divided into a number of subframes in the time domain. A subframe is defined as two consecutive slots therefore each subframe includes two slots, each slot having half the time duration of the subframe. The frequency domain is divided into subcarrier spaced by a pre-defined frequency (e.g., 15 kHz, 7.5 kHz). The smallest time-frequency unit for downlink transmission is denoted a resource element. Therefore, each subframe is composed of a certain number of orthogonal frequency division multiplexing (OFDM) symbols in time, and a certain number of OFDM subcarriers in frequency. The resource in a subframe is allocated in the unit of a physical resource block (RB). The resource block is defined as consecutive OFDM symbols (e.g., 7 symbols, or a slot) in the time domain and consecutive subcarriers (e.g., 12, 24) in the frequency domain. Two RBs in two slots of a subframe being allocated in a pair is called a RB pair, which for simplicity is referred to as RB allocation. A subband is defined as a group of resource blocks in the frequency domain.

A downlink physical channel corresponds to a set of resource elements carrying information originating from higher layers or physical layers. Mixing or overlaying control signals with shared data in a single OFDM symbol is prohibited in 3GPP LTE specification Release-8/9/10. Therefore, separate data regions and control regions are defined. For example, in LTE rel-10 and earlier systems, a PDCCH (Physical Downlink Control Channel) and a PDSCH (Physical Downlink Shared Channel) are defined. PDSCH is used to carry data information, while the PDCCH is used to carry control information of the PDSCH, such as the resource allocation information, modulation and coding information, etc. The downlink control information mapped on the control channel (PDCCH) has different formats and depending on its size, it is transmitted in one or more control channel elements (CCEs). The control channel (PDCCH) provides downlink or uplink resource allocation information related to the data channel.

PDCCH is located in the first several symbols in a subframe (e.g., one to four). The first several symbols carrying the PDCCH are called control region. Other symbols are used to carry data transmission, and are referred to as the data region. Hence PDCCH is located in control region and PDSCH is located in data region. The control region may include other control channels, such as the PHICH (Physical hybrid Indicator Channel), which is used to transmit ACK/NACK in response to uplink data transmission, or the PCFICH (Physical control format indicator channel) indicating the number of symbols of control region in a subframe.

In LTE-A release 11 or beyond, a new type of control channel located in the data region of a subframe may be considered. One or more resource blocks can be allocated to a UE to carry control information of a PDSCH channel, or control information of a PUSCH channel, such as UL grant information. In the following, this channel is referred to as Enhanced Physical Downlink Control Channel (E-PDCCH) for a new type of UL grant or DL grant channel.

FIG. 1 illustrates the location of the E-PDCCH in a subframe. The sub-frame shows the location of the control channel region 1 (PDCCH), a data region 2. The control region 1 also includes channels for other control information such as PHICH, PCFICH etc. Within the conventional data region 2, there may be one or more E-PDCCH to carry control information for PDSCH or PUSCH as illustrated. The E-PDCCH channel may be frequency-division multiplexed with PDSCH.

Figure 2A:
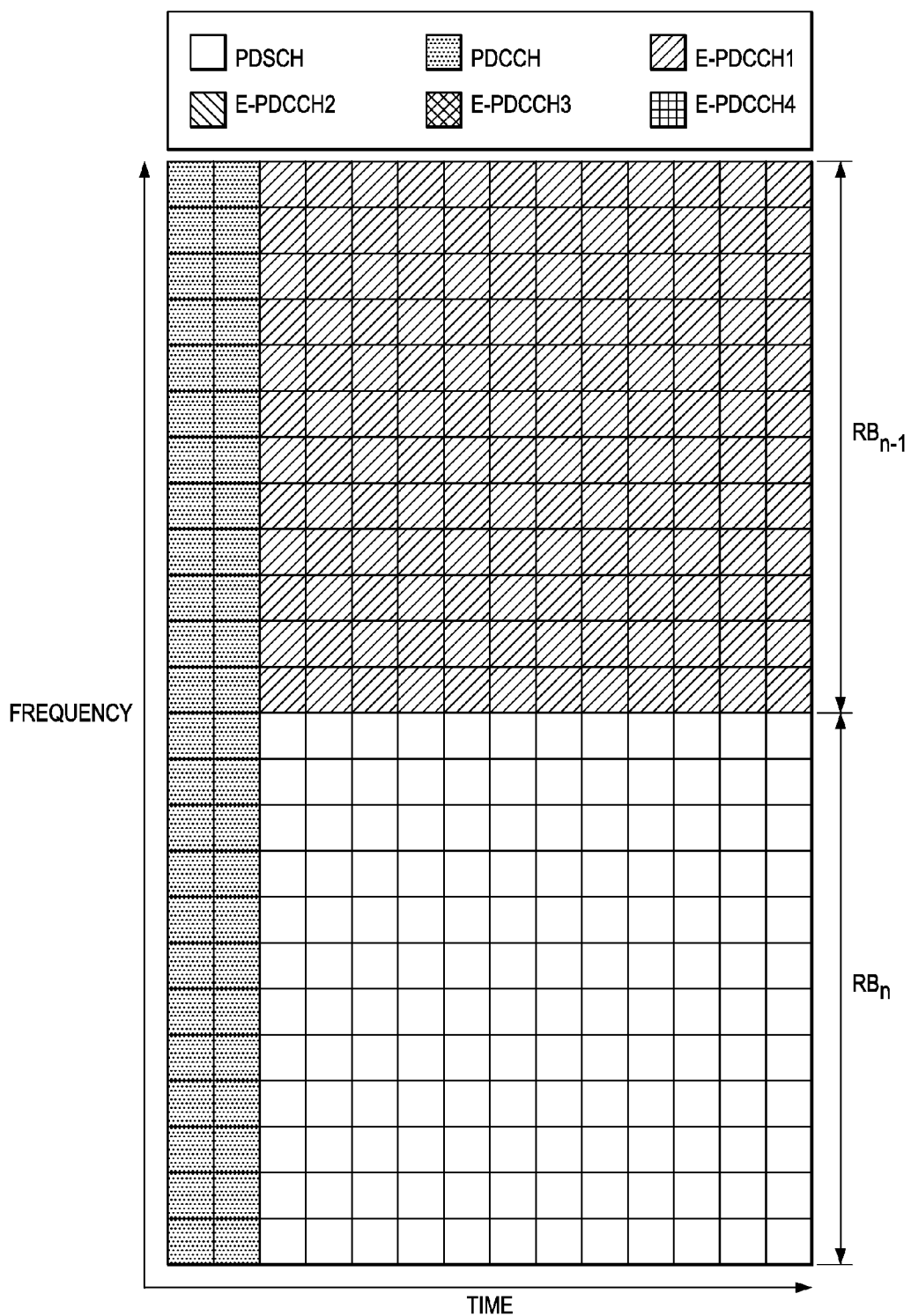
Figure 2D:
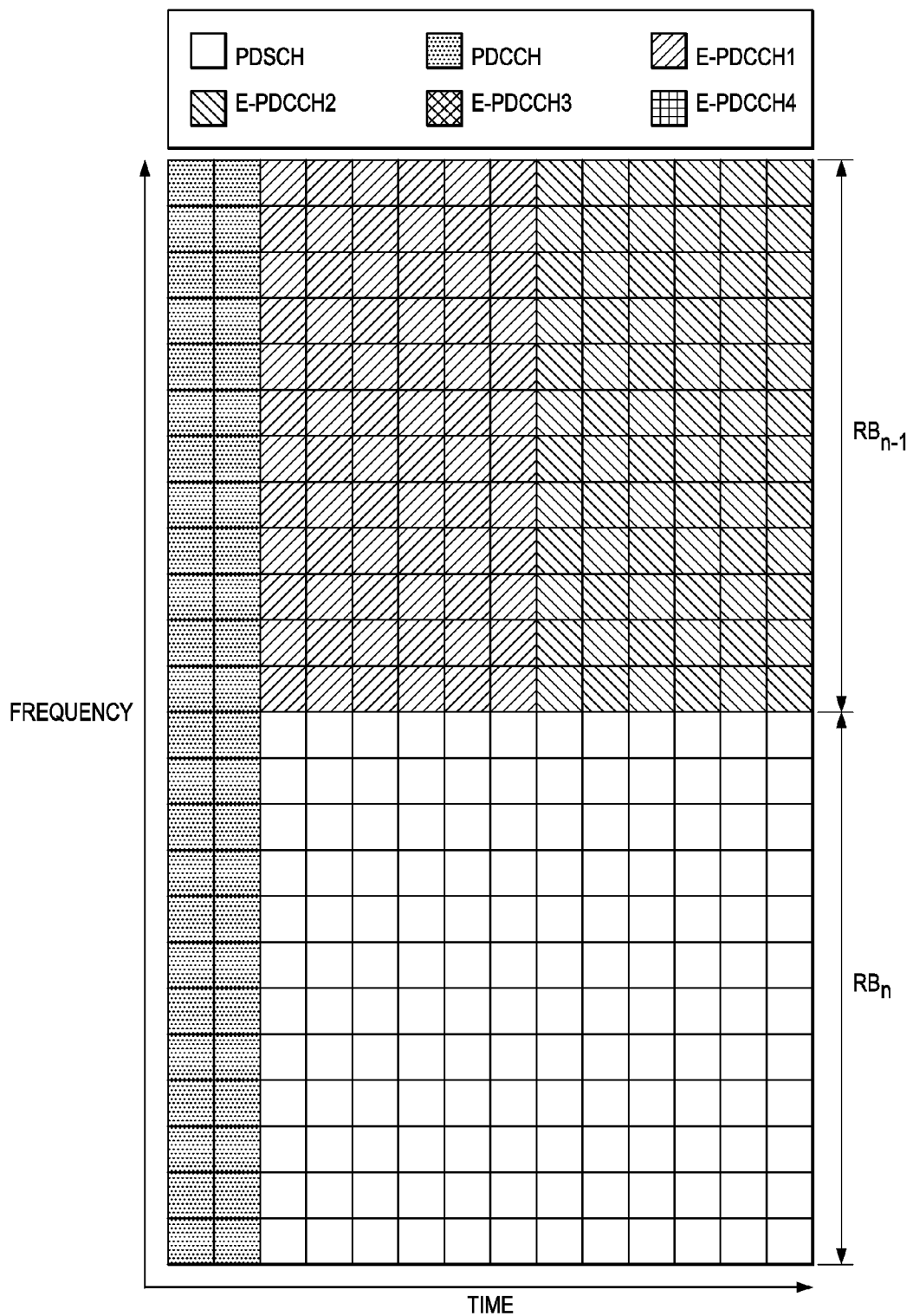
Figure 2E:
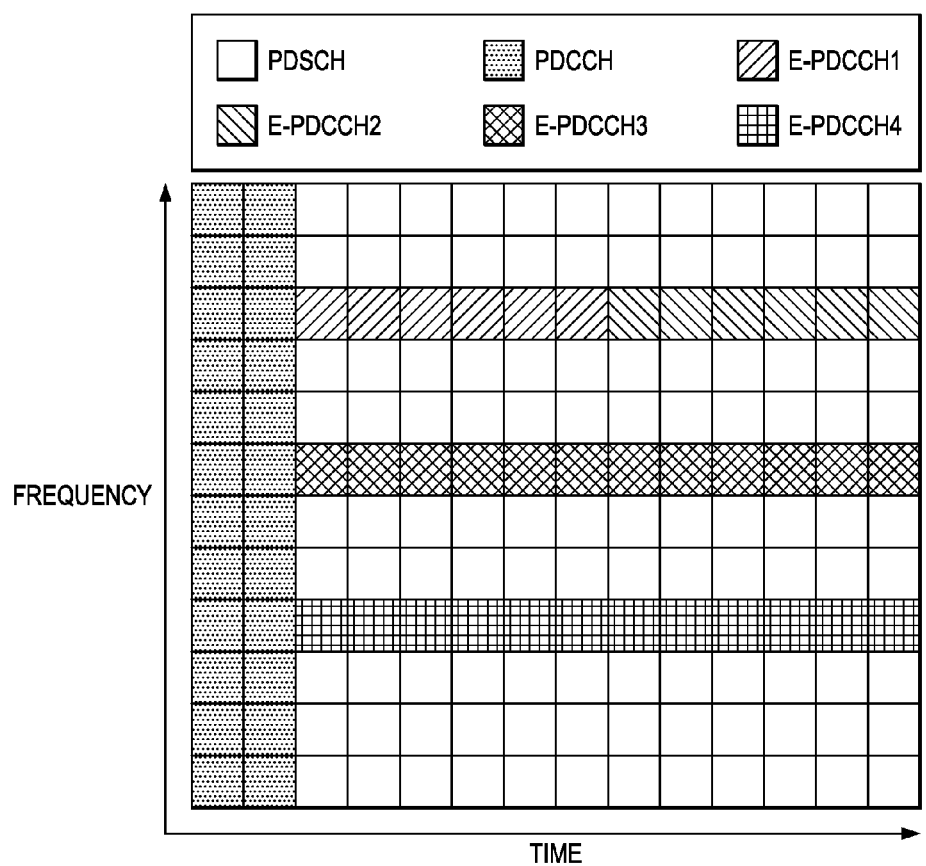

FIG. 2, which includes FIGS. 2a-2e, illustrates resource allocation in an enhanced control channel using embodiments of the invention. The resource allocation for E-PDCCH may be frequency-division multiplexed with the data channel. As illustrated in one example in FIG. 2a, one or more RBs can be allocated to a UE for E-PDCCH. Hence, the RBs with better channel condition or better CQI may be preferentially allocated to a UE for E-PDCCH. In FIG. 2a, a resource block $RB_{n-1}$ is assigned to be a control channel (E-PDCCH) for the UE while an adjacent $n^{th}$ resource block $RB_n$ is assigned to be a data channel (PDSCH) for the UE.

FIG. 2b illustrates an alternative embodiment in which a portion of the resource block is assigned to be a control channel (E-PDCCH) and a remaining portion of the resource block is assigned to be a data channel (PDSCH).

FIG. 2c illustrates another alternative in which multiple UE may share control channel in a $n^{th}$ resource block. In FIG. 2c, a first UE is allocated a first E-PDCCH1, a second UE is allocated a second E-PDCCH2, and a third UE is allocated a third E-PDCCH3. Advantageously with frequency division multiplexing with data channel, if a RB in a search space of control channel (control channel candidates resource region) for a UE is not allocated to any control channel, the RB can be allocated to data channel. This will be described further below e.g., with respect to FIG. 5. FIGS. 2d and 2e illustrate another alternative in which multiple UE may share control channel in a resource block, wherein a first UE is allocated a first E-PDCCH1 and a second UE is allocated a second E-PDCCH2.

Usually, there is a search space of control channel resource allocation for a UE. Within the search space, there are multiple control channel candidates, where each control channel candidate may be used for transmitting a control channel. An eNodeB may determine a control channel candidate from the search space to carry the control channel. The UE may blindly detect each control channel candidates within its search space for control channel detection. If a control channel for the UE has been correctly detected, such as CRC checks, the UE knows the control channel is for itself. Then the signaling carried in the control channel will be used for the UE to determine the information about PDSCH or PUSCH. This allocation of the enhanced control channel must be communicated to the respective UEs. A simple solution is to use higher layer signaling to indicate resource allocated for E-PDCCH, for example, a search space of E-PDCCH. However, this simple solution may be problematic; for example, the resource allocation for E-PDCCH may not be adapted to the dynamic change of channel and interference condition. Therefore, the RBs selected for E-PDCCH transmission may not reflect the channel and interference condition because the selection is in a semi-static way using a slow RRC signaling. Consequently, the E-PDCCH will suffer either in term of decoding performance or blocking probability for resource allocation. Because E-PDCCH carries control information for the data channel PDSCH/PUSCH, loss of the control information results in loss of the data transmission as well.

Additional control channels may be added to indicate E-PDCCH resource allocation, but will require more overhead. Such extra control channels may render the transmission to be less reliable because the UE needs to detect both the additional control channel and the E-PDCCH.

Embodiments of the invention teach a fast signaling of the RB selection that overcomes these limitations and other limitations. Hence, it would be very beneficial for eNodeB to use PMI and/or CQI feedback to allocate resource for E-PDCCH for a UE in time.

Figure 3:
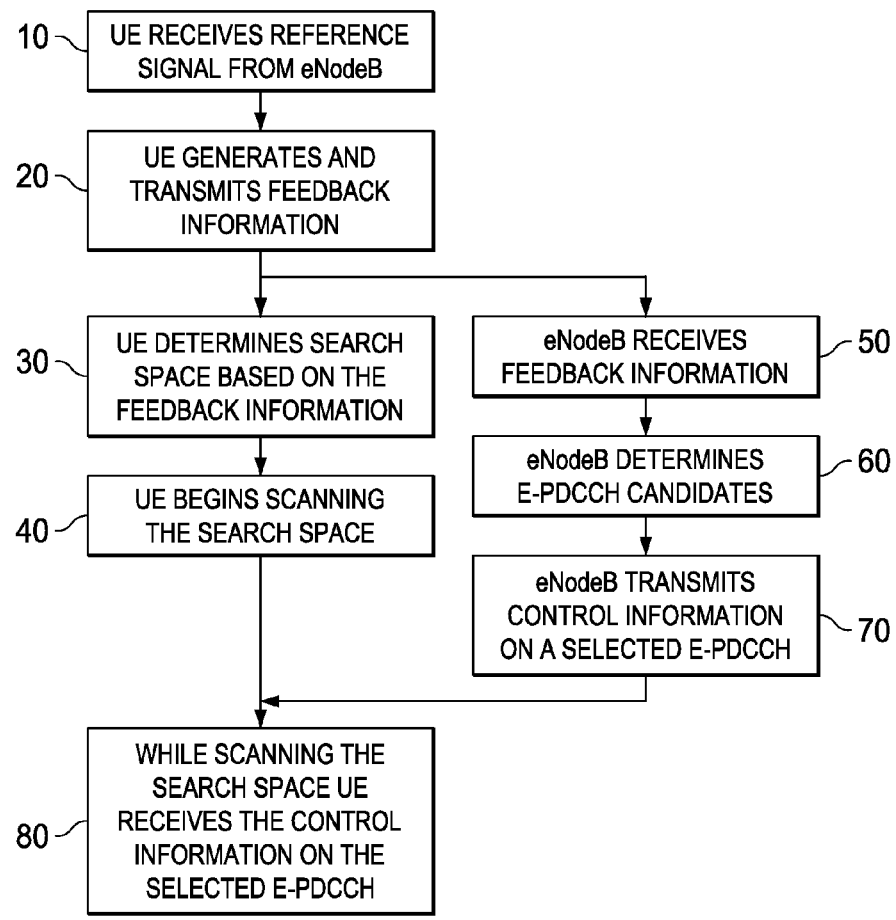
FIG. 3 describes operations for allocating resource for an enhanced control channel in the data region in accordance with an embodiment of the invention.

FIG. 3 describes operations for allocating resource for an enhanced control channel in the data region in accordance with an embodiment of the invention.

In various embodiments, the present invention describes a dynamic scheme to allocate resource for an enhanced control channel. Referring to FIG. 3, a UE receives a reference signal from the base station eNodeB (step 10). The reference signals may be UE-specific. The UE may be informed by higher layers using the UE-specific reference signal, such as the CSI-RS (channel status indicator reference signal) in 3GPP LTE-A release 10. Alternatively, in some embodiments, the reference signal may be a cell-specific reference signal, for example the common reference signal in LTE release-8.

Figure 4:
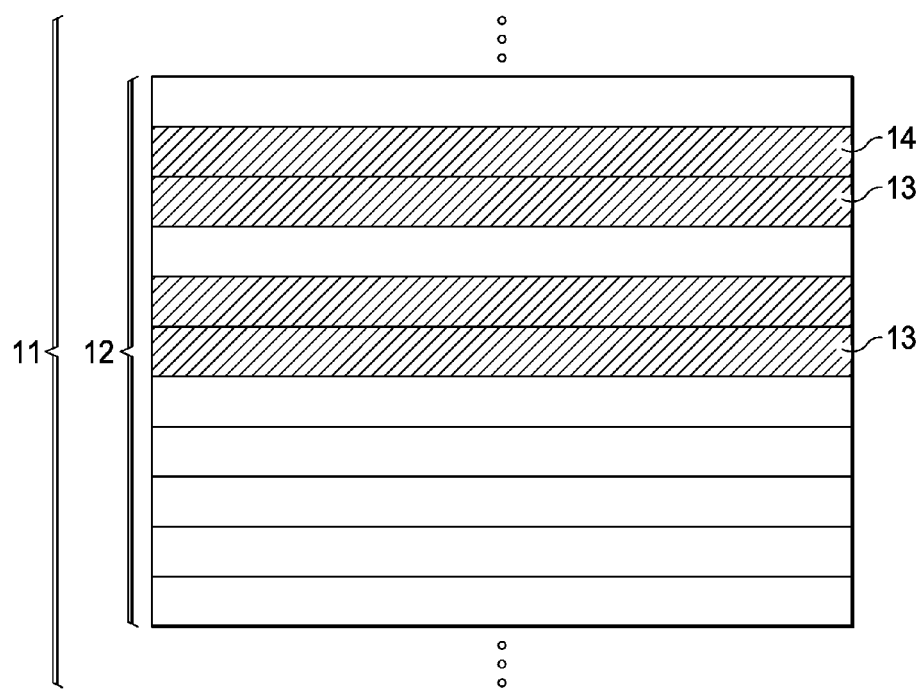
FIG. 4 illustrates a bandwidth having a plurality of subbands with the best M subbands and the first N subbands within the set of M subbands in accordance with an embodiment of the invention.

The UE receives the reference signal from the eNodeB and calculates feedback information including a channel quality indicator (CQI), and/or a precoding matrix indicator (PMI), and/or a rank indicator (RI) for a resource. The UE transmits the feedback information to the eNodeB (step 20). In various embodiments, a UE may aperiodically or periodically feedback PMI/CQI information for all of the subbands (or a group of subbands) or the several subbands to eNodeB chosen by eNodeB or UE. A subband is a group of resource blocks. In 3GPP LTE release 8/9/10, CQI/PMI feedback scheme has been defined for data channel. A similar CQI/PMI feedback scheme can be used for E-PDCCH candidates resource allocation. Alternatively, the same CQI/PMI feedback scheme can be used for both PDSCH and E-PDCCH. For example, the UE may report a CQI for each subband in a predefined group of subbands or a signaled group of subbands. The UE may report a single PMI for all the subbands in the group of subbands. Therefore, the first several subbands with the highest CQI values could be defined for the resource allocation of E-PDCCH candidates. Alternatively, the UE may report the best M subbands within the whole bandwidth and/or a single CQI value for the whole reported M subbands. The UE may also report precoding matrix indicator for each subband within the set of M subbands. The E-PDCCH candidates resource allocation can be in the best M subbands reported by the UE, or a subset of the best M subbands, for example, the first N (N≤M) subbands with the lowest subband indices. In various embodiments, M and N are positive integers that can either be predefined in specification or signaled. As an illustration, FIG. 4 shows a bandwidth 11 having a plurality of subbands 12 with the best M subbands 13 and the first N subbands 14 as described above. Generally, a UE may report a channel quality indicator for a subband or a resource block.

The base station eNode B receives the feedback information from the UE (step 40) and determines E-PDCCH candidates for transmitted E-PDCCH to the UE (step 60). A rule may be defined in the specification to determine the feedback used to determine the resource allocation of E-PDCCH candidates. Generally, the eNodeB determines E-PDCCH candidates on a resource carried in the feedback information of a UE. For example, one subframe out of every K subframes from the UE may carry feedback information for determining the resource allocation of E-PDCCH for later transmission. K is a positive integer.

In various embodiments, the resource allocation for E-PDCCH candidates for a UE depends on the feedback of the UE in a specific time instance. For example, based on the feedback information from the UE, the eNodeB knows which set of subbands have the best channel and interference condition, and/or the corresponding PMI to obtain the CQI. A rule may be predefined in a specification, such as the 3GPP standard for eNodeB to determine which subbands are used for resource allocation for E-PDCCH, and which RBs in a specific subband are used for resource allocation for E-PDCCH. For example, the first N subbands with highest CQI values may be chosen for E-PDCCH candidates, and/or the first L RBs (RBGs) in the specific subbands may be chosen for E-PDCCH candidates. One may also define the first N subbands in terms of other orders such as subband indices for E-PDCCH resource allocation. The eNodeB may select one or more candidates to transmit the E-PDCCH for the UE considering the resource allocation coordination with other UEs. If the first N subbands are selected based on CQI value, the eNodeB may compare the CQI values of subbands to determine the first N subbands with highest CQI values for E-PDCCH. Alternatively, the channel feedback information comprises channel quality indicator for each subband in a group of subbands and/or a single precoding matrix indicator. The group of subbands for feedback may be signaled to the UE or predefined in standard.

The UE determines the search space of E-PDCCH based on the feedback information (step 30). The UE is aware that eNodeB will assign E-PDCCH based on the UE feedback, e.g., based on a standard specification. Therefore, UE has the information in which search space E-PDCCH will be transmitted without any signaling from the eNodeB. Advantageously, UE may compare the CQI values of subbands to determine the search space of E-PDCCH without explicit signaling from eNodeB. The UE begins blindly detecting or scanning the search space based on the transmitted feedback in a specific predefined time instance (step 50). As described above, this may be provided using a standard, for example, a definition in the standard tells the UE which previous feedback determines the present search space. For example, the UE feedback in subframe n–k will determine the search space for subframe n, where n, n–k are integers to represent subframe numbers, k is a positive integer. In various embodiments, the UE operations (steps 30 and 40) may be performed in parallel with the eNodeB operations (steps 50, 60, and 70).

In various embodiments, using the above scheme, the eNodeB always tries to schedule the E-PDCCH transmission to the target UE based on the specific available feedback information of the changing channel and interference condition. Advantageously, as the CQI/PMI information for the desired subbands is needed for data scheduling and already exists, no additional overhead is incurred by introducing the proposed E-PDCCH scheduling scheme.

In one or more embodiments, when eNodeB determines the resource allocation based on the feedback, the eNodeB only uses the resource indicated by the feedback of the UE.

Figure 5:
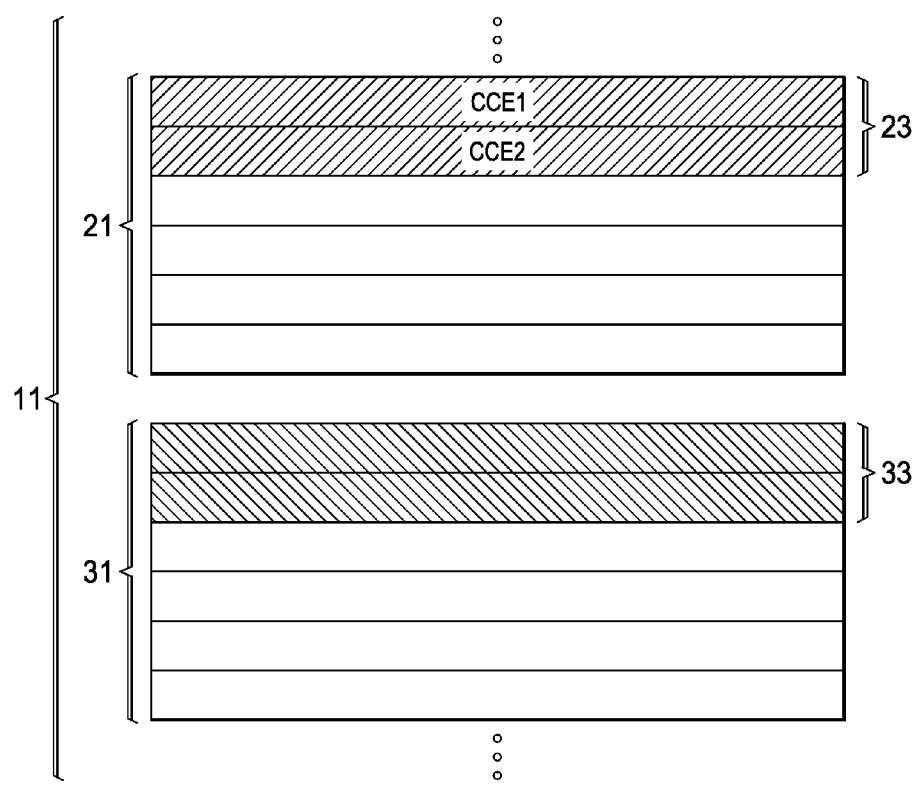
FIG. 5 illustrates a further embodiment wherein multiple UEs select the same subband for allocation of the enhanced control channel.

FIG. 5 illustrates a further embodiment wherein multiple UEs select the same subband for allocation of the enhanced control channel.

A base station eNodeB serves a plurality of users. Therefore, it is possible that more than one UE selects the same sub-band (or resource block etc.) as the best candidate for E-PDCCH. However, each UE must be allocated with different resources. In various embodiments, if the subbands for E-PDCCH candidates resource allocation for two UEs overlap, then E-PDCCH of two UEs may be multiplexed together in one subband by frequency division multiplexing, time division multiplexing, or spatial multiplexing (e.g., as illustrated in different embodiments in FIG. 2). In FIG. 5, a first subband 21 and a second subband 31 are indicated by two separate UEs as being the subbands with the best CQI. In other words, a first UE indicates a first subband 21 as the subband with the best CQI and a second subband 31 as the subband with the second best CQI. Similarly, a second UE indicates that the first subband 21 as the subband with the best CQI and the second subband 31 as the subband with the second best CQI. For example, a first group of resource blocks 23 within the first subband 21 and a second group of resource blocks 33 within the second subband 31 are highlighted by the UEs as being the best and the second best channels.

As described previously, a CCE is a control channel element to form a control channel. For example, one RB or half a RB could be a single CCE. In the following, we assume one RB is one CCE only for illustration. A control channel could be made of one or more CCEs. The number of CCEs that make up a control channel is called the CCE aggregation level for a control channel. The CCE aggregation level can be 1, 2, 4, 8 etc., as an example. For each aggregation level, there may be a search space for a UE.

The base station eNodeB may allocate a first resource block (CCE1) in the first group of resource blocks 23 in the first subband 21 to the first UE and a second resource block (CCE2) in the first group of resource blocks 23 in the first subband 21 to the second UE. Thus, the first resource block (CCE1) is the control channel for the first UE, and the second resource block (CCE2) is the control channel for the second UE. Therefore, the first and the second RBs (CCE1 and CCE2) are not allocated to any users for PDSCH transmission. However, the second group of resource blocks 33 in second subband 31 may not be needed for E-PDCCH, and therefore may be allocated to a UE for PDSCH transmission.

Figure 6:
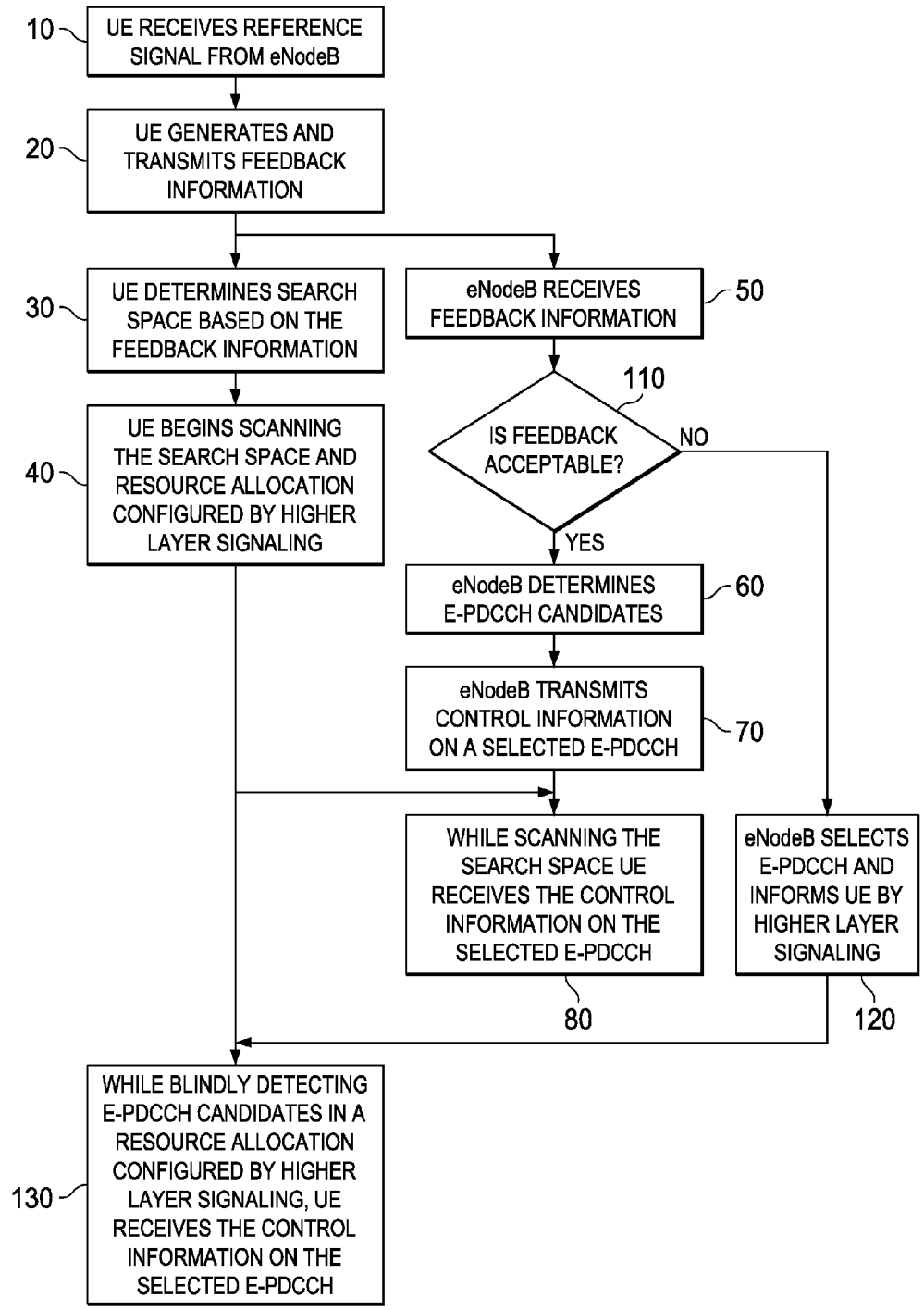
FIG. 6 illustrates operations in an alternative embodiment of the present invention having a hybrid scheme for allocation of an enhanced control channel in a data region of a radio frame.

FIG. 6 illustrates an alternative embodiment of the present invention having a hybrid scheme for allocation of an enhanced control channel in a data region of a radio frame.

Unlike the prior embodiment described in FIG. 3, this embodiment accounts for that the fact that sometimes the UE feedback is unreliable. For example, the eNodeB may miss feedback information from a UE, or the eNodeB receives the feedback information from UE but determines that the decoding results have a high probability to be wrong e.g., based on the likelihood ratio estimation. In this case, eNodeB may not use the feedback information to determine the resource allocation for E-PDCCH candidates. Rather, a resource allocation configured by higher layer signaling may be used for E-PDCCH candidates to reduce the negative effect of missing feedback information. Thus, this alternative embodiment uses a hybrid scheme to allocate resources for E-PDCCH candidates.

Referring to FIG. 6, the eNodeB operations proceed as described with respect to FIG. 3 until the eNodeB receives feedback information. Therefore, the eNodeB receives PMI/CQI feedback along with the best subbands' index information from a UE at a specific subframe (or any time instance). After receiving the feedback information, the eNodeB evaluates if the feedback is acceptable (step 110).

If the feedback is reliable, the operations proceed as described with respect to FIG. 3. Therefore, the eNodeB selects E-PDCCH candidates according to a predetermined specification and transmits on the selected E-PDCCH (steps 60 and 70). In particular, eNodeB transmits E-PDCCH in the resource restricted by this latest available feedback for E-PDCCH candidates from the UE. The UE receives the E-PDCCH while scanning the search space, which was determined based on its feedback to eNodeB (step 80) as in the prior embodiment.

If the feedback is considered unreliable, eNodeB will not use this feedback information for resource allocation for E-PDCCH. Instead, a resource allocation configured by higher layer signaling may be used for allocating E-PDCCH candidates (step 120). However, the search space configured by higher layer signal can be used being independent on the reliability of detection of feedback information. In other words, even the feedback information is reliable enough, the eNB still may allocate the E-PDCCH in the search space configured by a higher layer signaling, as an example, to avoid the control channel allocation collision with other users.

In various embodiments, the eNodeB may configure two types of search spaces dynamically. One search space is configured by higher layer signaling, and the other search space is restricted by feedback information from the UE. In various embodiments, the eNodeB may configure a UE with search space only configured by higher layer signaling, or with search space only restricted by feedback information, or with one search space configured by higher layer signaling and the other search space restricted by feedback information. The reason is that some UEs may have very reliable uplink transmission for CQI feedback and the eNodeB may use the feedback information from these UEs to get more gain, but for other UEs that don't have very reliable uplink transmission, search space configured by higher layer signaling is more appropriate. But some UEs may be in between the two types of UEs described above. Hence a hybrid scheme is applicable. For the hybrid scheme with two types of search space for E-PDCCH, the explicit search space size for each search space may be adjusted according to the different UE channel conditions.

The UE receives the information regarding the E-PDCCH through higher layer signaling. The UE receives a subframe having the E-PDCCH while scanning a search space determined by the higher layer signaling (step 130). In various embodiments, the UE may blindly detect in both the search space restricted by the feedback information sent to eNodeB and also blindly detect E-PDCCH candidates in a resource allocation configured by higher layer signaling. In some embodiments, the UE may also blindly detect in the search space restricted by the feedback information sent to eNodeB in a specific time instance. For example, after the UE transmits a current feedback information, the UE may receive a subframe transmitted by the eNodeB using the previous feedback information in a specific time instance. In various embodiments, the UE operations (steps 30 and 40) may be performed in parallel with the eNodeB operations (steps 50, 110, 60, 70, 120).

In various embodiments, at the UE side, the UE blindly detects the E-PDCCH candidates in the search space. The search space is the resource set of all E-PDCCH candidates for the UE. The E-PDCCH candidates set is restricted by the feedback information of the UE and the restriction follows the same rule as applied to eNodeB, e.g., from a standard. Therefore, the UE knows which E-PDCCH candidates will be blindly decoded. After decoding of E-PDCCH, the UE performs an error detection check to ensure that the integrity of the data is not compromised. If an error detection check is satisfied (e.g., cyclic redundancy check), the UE may assume that the control channel has been correctly decoded. In the hybrid scheme described above, the UE may also blindly detect the E-PDCCH in another search space configured by a higher signaling.

Figure 7:
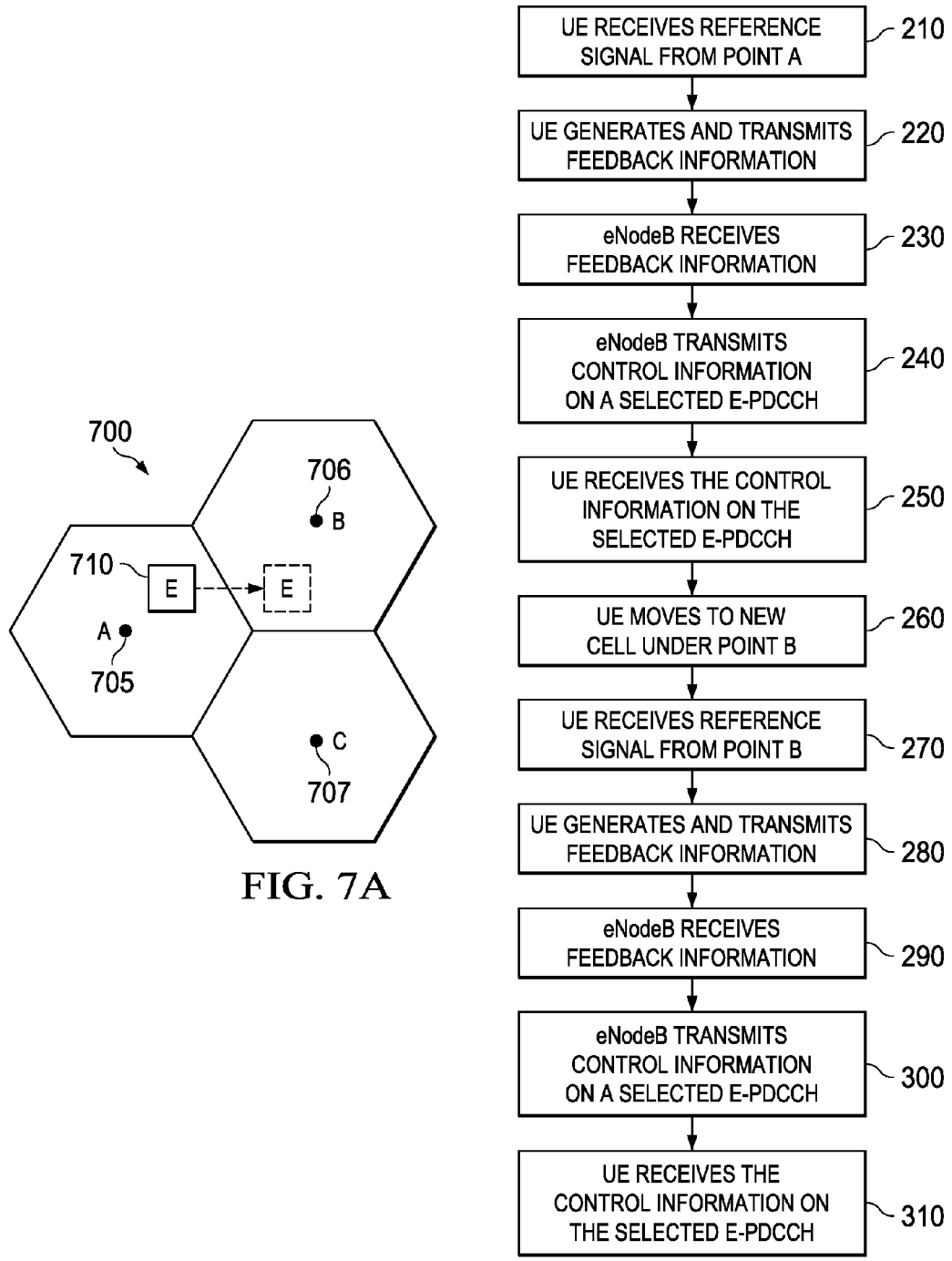
FIG. 7, which includes

FIG. 7, which includes FIGS. 7A and 7B, illustrates an embodiment of the invention applied to UE mobility across multiple cells or multiple base stations.

Wireless communications system 700 includes base stations. Each base station may control one or multiple transmission points, such as a first point 705, a second point 706, and a third point 707. These transmission points may be the RRH (remote radio head), or transmission antennas which connect to one single base station or multiple separated base stations, for example, the eNodeB(s). As illustrated, a cluster of points serve multiple users in a wireless communications system. A point may serve communications within a certain area such as cells A, B, or C. Each cell has multiple transmit antennas at a transmission point of the eNodeB. Each cell (or point) typically has a number of users (or UE's) that it serves over a period of time. As an illustration, wireless communications system 700 includes a user equipment UE E 710 initially operating in a cell associated with the first point 705 (cell A). The enhanced control channel (E-PDCCH) is allocated during the session with the UE E 710 as described above using FIG. 3 or FIG. 6. For example, the UE E 710 receives reference signal from the first point 705 (step 210) and generates and transmits feedback information about point 705. The eNodeB associated with the first point 705 receives the feedback information from the UE E 710 (step 230) and allocates a control channel based on the feedback information. The first point 705 transmits the control information (step 240), which is received the UE E 710 (step 250) by blindly searching the search space designed from the transmitted feedback and/or higher layer signaling as described in earlier embodiments.

During a session, the UE E 710 may move into another cell such as a cell B associated with the second point 706 (step 260). Advantageously, using embodiments of the invention, the steps 210, 220, 230, 240, 250 are repeated with the second point 706 and the eNodeB associated with the point 706. The enhanced control channels transmitted by point 706 are allocated based on the UE feedback. Accordingly, the UE receives a reference signal from the second point 706 (step 270), and generates and transmits a feedback about the point 706. The eNodeB associated with the second point 706 receives the feedback information and transmits control information on one or more of the channels identified by the UE E 710 and/or higher layer signaling as described earlier (steps 290 and 300). The UE E 710 receives the control information by blindly searching the search space designed from the transmitted feedback and/or higher layer signaling as described in earlier embodiments (step 310). The eNodeBs associated with different points may be same or different.

Figure 8:
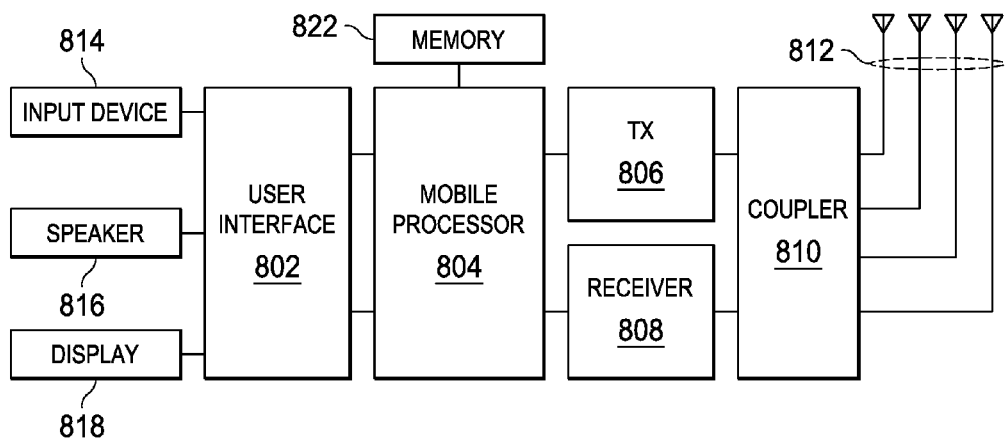
FIG. 8 illustrates a user equipment implementing embodiments of the invention.

A block diagram of embodiment of an user equipment UE is illustrated in FIG. 8. The UE, can be, for example, a cellular telephone or other mobile communication device, such as a computer or network enabled peripheral. Alternatively, the UE can be a non-mobile device, such as a desktop computer with wireless network connectivity. In various embodiments, UE may be the UE described above in various embodiments, for example, with respect to FIGS. 3, 6, 7.

The UE has mobile processor 804, a transmitter (TX) 806 and a receiver 908, which are coupled to an antenna 812 via a coupler 810. The transmitter (TX) 806 and the receiver 808 may comprise a common circuitry or may be comprise separate circuitry. In one or more embodiments, the embodiments of the invention described with respect to FIGS. 3, 6, and/or 7 may be implemented as hardware within the transmitter 806 and/or the receiver 808, or as a separate circuitry. Some or all of the algorithms, such as to implement the operations described with respect to FIGS. 3, 6, and/or 7, may also be implemented as software executed using the mobile processor 804.

An user interface 802 may be coupled to the mobile processor 804 and provides interfaces to input device 814, an optional speaker 816, and a display 818, for example. Alternatively, the UE may have a different configuration with respect to user interface 802, or user interface 802 may be omitted entirely. The UE may have multiple transmitters, receivers and antennas to support MIMO operation.

The base station eNodeB has a memory 822 that may be used to store instructions/data for implementing embodiments of the invention. The memory 822 may be any type of readable memory including read only and/or read/write memories. The memory 822 may also include storage mediums such as optical, magnetic drives etc.

Figure 9:
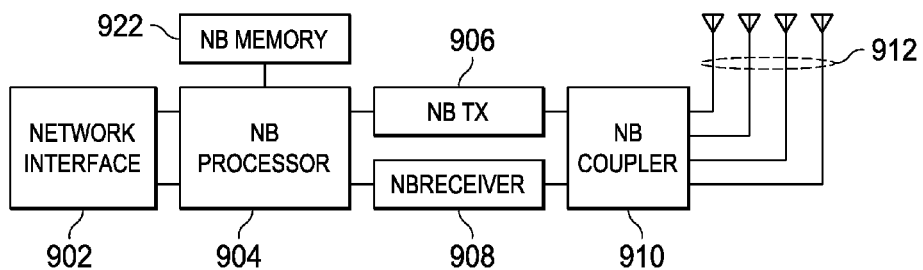
FIG. 9 illustrates a base station eNodeB implementing embodiments of the invention.

A block diagram of an embodiment base station eNodeB is illustrated in FIG. 9. The base station eNodeB has a NB processor 904 coupled to a NB transmitter (TX) 906 and a NB receiver 908, and a network interface 902. The NB transmitter 906 and the NB receiver 908 are coupled to an NB antenna 912 via a NB coupler 910. The NB processor 904 executes embodiment methods and algorithms as described above, for example, in FIGS. 3, 6, 7.

In one or more embodiments, the eNodeB operations as described above, for example, in FIGS. 3, 6, 7, may be implemented within the NB transmitter 906, the NB receiver 908, or as a separate circuitry. Some or all of the algorithms, such as to implement the operations illustrated in FIGS. 3, 6, and 7, may also be implemented as software executed using the NB processor 904.

The base station eNodeB has a NB memory 922 that may be used to store instructions/data for implementing embodiments of the invention. The NB memory 922 may be any type of readable memory including read only and/or read/write memories. The NB memory 922 may also include storage mediums such as optical, magnetic drives etc.

Figure 10:
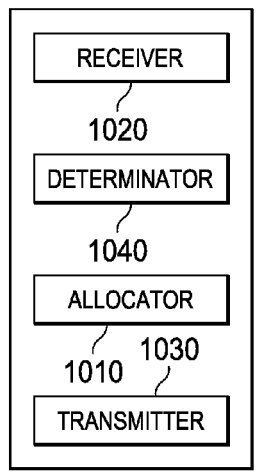
FIG. 10 illustrates a network component in accordance with embodiments of the invention.

FIG. 10 illustrates a network component in accordance with embodiments of the invention. The network component may be a base station or a relay station supporting a user equipment in various embodiments.

Referring to FIG. 10, the network component comprises a allocator 1010, a receiver 1020, a transmitter 1030, and a detector 1040. The allocator is configured to allocate a first control channel in a first data region of a first subframe based on a first channel feedback information from a first user equipment. The allocator 1010 is configured to allocate the first control channel as being frequency division multiplexed with a first data channel in the first data region.

In various embodiments, the receiver 1020 is configured to receive the first channel feedback information from the first user equipment. The transmitter 1030 is configured to transmit the first subframe comprising the first control channel to the first user equipment.

In one or more embodiments, the determinator 1040 is configured to determine if the first channel feedback information is reliable. The allocator 1010 is configured to allocate the first control channel in the first data region of the first subframe if the first channel feedback information is reliable.

In one or more embodiments, the allocator 1010 is configured to allocate the first control channel in the first data region of the first subframe based on a configuration by signaling from a higher layer if the first channel feedback information is not reliable. The transmitter 1030 is configured to transmit an information regarding the first control channel using a higher layer signaling to the first user equipment. The information comprises location of the first control channel in the first subframe in various embodiments.

In various embodiments, the first channel feedback information comprises channel quality indicator for each subband in a group of subbands. The allocator 1010 is configured to allocate the first control channel based on a subband with a highest channel quality indicator.

In various embodiments, the receiver 1020 is configured to receive a second channel feedback information from a second user equipment. The first channel feedback information designates a first subband as a subband with a highest channel quality indicator for the first user equipment. The second channel feedback information designates the first subband as a subband with a highest channel quality indicator for the first user equipment. The allocator 1010 is configured to allocate a first resource block in the first subband in the data region of the subframe as a second control channel. The allocator 1010 is configured to allocate a second resource block in the first subband as the first control channel. The transmitter 1030 is configured to transmit the first subframe by transmitting the second control channel to the second user equipment.

In one or more embodiments, the wireless communication is compliant with Long Term Evolution (LTE) release 11 or higher, wherein the first control channel is an Enhanced Physical Downlink Control Channel (E-PDCCH). The data region is a region of a subframe allocated for data in LTE release 10, and the allocator 1010 is configured to allocate the first control channel using a standard based on LTE release 11 or higher.

Figure 11:
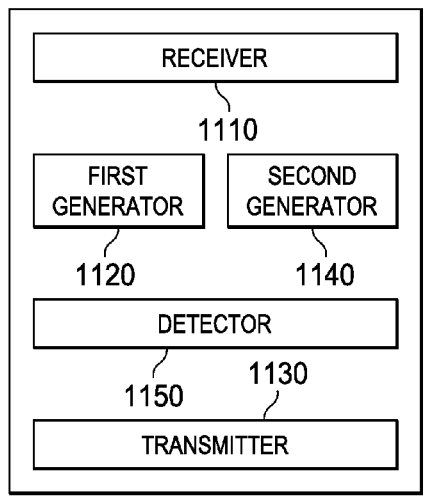
FIG. 11 illustrates a wireless device in accordance with embodiments of the invention.

FIG. 11 illustrates a wireless device in accordance with embodiments of the invention. The wireless device may be a phone, smartphone, tablet, or any other type of communication device.

Referring to FIG. 11, the wireless device comprises a receiver 1110, a first generator 1120, a transmitter 1130, a second generator 1140, and a detector 1150.

The receiver 1110 is configured to receive a first reference signal and to receive a subframe from a first base station. The first generator 1120 is configured to generate a channel quality feedback information based on the first reference signal. The transmitter 1130 is configured to transmit the channel quality feedback information. The second generator 1140 is configured to generate a first search space for control channel candidates. The second generator 1140 is configured to generate the first search space based on the channel quality feedback information. The first search space includes a potential location of a control channel in a data region of a received subframe. The detector 1150 is configured to detect a first control channel element in the received subframe by searching the first search space and/or a second search space. In various embodiments, the channel feedback information comprises channel quality indicator for each subband in a group of subbands.

In one or more embodiments, the second generator 1140 may be further configured to generate the second search space for control channel candidates. The second generator may be configured to generate the second search space based on higher layer signaling.

In an embodiment, the eNodeB is configured to operate in a LTE network using an OFDMA downlink and uplink channels. In alternative embodiments, other systems, network types and transmission schemes can be used, for example, WiMax, 1XEV-DO, IEEE 802.11, IEEE 802.15 and IEEE 802.16. The eNodeB may have multiple transmitters, receivers and antennas to support MIMO operation.

Incorporating an enhanced control channel (E-PDCCH) in the data region in accordance with embodiments of the invention has many advantages. For example, different cells may allocate orthogonal time-frequency resource for the E-PDCCH, thus the interference between E-PDCCH of different cells is significantly lowered. Another benefit is that a dedicated reference signal can be used for the E-PDCCH. In other words, an E-PDCCH has its own reference signal for channel estimation during demodulation, thereby allowing more advanced transmission schemes, such as beamforming or precoding.

Further, DeModulation Reference Signals (DMRS) in the downlink, which are dedicated signals, may be used for the E-PDCCH. Therefore, precoding may be used for E-PDCCH thereby enhancing the performance of E-PDCCH. Further, MU-MIMO or SU-MIMO (spatial multiplexing) may be used for E-PDCCH to increase the capacity of E-PDCCH. The E-PDCCH in the search space restricted by feedback information can use the precoding matrix indicator(s) in the feedback information to have better performance.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium or nonvolatile computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communication comprising:
    at a first base station, allocating a first control channel for a first user equipment in a first data region of a first subframe, wherein a location of the first control channel is indicated by a first channel feedback information from the first user equipment, wherein the first subframe comprises the first data region and a fixed control channel having a predetermined location for providing resource allocation information related to the first data region to the first user equipment; and
    transmitting the first control channel within the first subframe to the first user equipment.

2. The method of claim 1, further comprising multiplexing the first control channel with a first data channel in the first data region, wherein the first control channel is multiplexed with the first data channel using a frequency division, a time division, a spatial division, or a hybrid division multiplexing scheme.

3. The method of claim 1, further comprising:
    receiving the first channel feedback information from the first user equipment; and
    determining if the first channel feedback information is reliable, wherein the first control channel is allocated in the first data region of the first subframe if the first channel feedback information is reliable.

4. The method of claim 1, further comprising:
    transmitting an information regarding the first control channel using a higher layer signaling to the first user equipment, wherein the information comprises location information of the first control channel in the first subframe, wherein the first control channel is allocated in the first data region of the first subframe in accordance with a higher layer signaling.

5. The method of claim 4, wherein the first control channel in the first data region of the first subframe is allocated in accordance with the higher layer signaling if the first channel feedback information is not reliable.

6. The method of claim 1, wherein the first channel feedback information comprises at least one of channel quality indicator for each subband in a group of subbands and a single precoding matrix indicator over all subbands within the group of subbands.

7. The method of claim 1, wherein first channel feedback information comprises at least one of M subbands, r one single channel quality indicator over all of the M subbands, and a precoding matrix indicator for each subband in the set of M subbands, where M is an integer signaled to the first user equipment or predefined in a standard.

8. The method of claim 1, wherein the first channel feedback information comprises at least one of a channel quality indicator and a precoding matrix indicator for a subband.

9. The method of claim 1, wherein the first channel feedback information comprises at least one of a channel quality indicator and a precoding matrix indicator for a resource block.

10. The method of claim 1, wherein allocating a first control channel in accordance with the first channel feedback information comprises allocating the first control channel on a set of subband(s) with the first k highest channel quality indicators, where k is an integer.

11. The method of claim 1, wherein allocating a first control channel in accordance with the first channel feedback information comprises allocating the first control channel on a resource block within subbands or resource blocks carried in the channel feedback information.

12. The method of claim 1, further comprising:
    receiving a second channel feedback information from a second user equipment, wherein the first channel feedback information designates a first subband as a subband with a highest channel quality indicator for the first user equipment, wherein the second channel feedback information designates the first subband as a subband with a highest channel quality indicator for the second user equipment;
    allocating a first resource block in the first subband in the data region of the subframe as a second control channel, wherein allocating a first control channel in a data region of a subframe comprises allocating a second resource block in the first subband; and
    transmitting the second control channel within the first subframe to the second user equipment.

13. The method of claim 1, further comprising:
    handing off the first user equipment to a second point;
    at a base station associated with the second point, receiving a second channel feedback information from the first user equipment;
    determining if the second channel feedback information is reliable;
    if the second channel feedback information is reliable allocating a second control channel in a second data region of a second subframe indicated by the second channel feedback information, the second control channel being multiplexed with a second data channel in the second data region; and
    transmitting the second control channel within the second subframe to the first user equipment.

14. The method of claim 1, wherein the wireless communication is compliant with Long Term Evolution (LTE) release 11 or higher, wherein the first control channel is an Enhanced Physical Downlink Control Channel (E-PDCCH), wherein the data region is a region of a subframe allocated for data in LTE release 10, and wherein allocating the first control channel comprises using a standard in accordance with LTE release 11 or higher.

15. A method for wireless communication comprising:
    at a first user equipment, receiving a first reference signal from a first base station;
    generating a channel feedback information in accordance with the first reference signal;
    transmitting the channel feedback information;
    receiving a first control channel within a data region of a first subframe from the first base station, wherein the first control channel is allocated by the first base station as indicated by the channel feedback information; and generating a first search space for control channel candidates, the first search space being generated in accordance with the channel feedback information, the first search space comprising potential location information of the first control channel in the data region of the first subframe.

16. The method of claim 15, wherein the channel feedback information comprises channel quality indicator for each subband in a group of subbands or a channel quality indicator for a subband.

17. The method of claim 15, wherein the channel feedback information comprises channel quality indicator for each subband in a group of subbands or a channel quality indicator for a resource block.

18. The method of claim 15, wherein the channel feedback information comprises channel quality indicator for each subband in a group of subbands or a channel quality indicator for a resource block.

19. The method of claim 15, further comprising:
detecting the first control channel in the first subframe by searching the first search space.

20. The method of claim 15, further comprising:
generating a second search space for control channel candidates, the second search space being generated in accordance with higher layer signaling; and
detecting the first control channel in the first subframe by searching the second search space.

21. The method of claim 15, wherein generating a first search space for control channel candidates comprises determining the first search space on a set of subband (s) with the first k highest channel quality indicators, where k is an integer.

22. The method of claim 15, wherein generating a first search space for control channel candidates comprises determining the first search space on a resource block within subbands or resource blocks carried in the channel feedback information.

23. A network component comprising:
an allocator configured to allocate a first control channel for a first user equipment in a first data region of a first subframe, wherein a location of the first control channel in the first data region is indicated by a first channel feedback information from the first user equipment, wherein the first subframe comprises the first data region and a fixed control channel having a predetermined location for providing resource allocation information related to the first data region to the first user equipment;
a receiver configured to receive the first channel feedback information from the first user equipment; and
a transmitter configured to transmit the first control channel within the first subframe to the first user equipment.

24. The network component of claim 23, wherein the allocator is configured to allocate the first control channel by multiplexing with a first data channel in the first data region.

25. The network component of claim 24, wherein the first control channel is multiplexed with the first data channel using a frequency division, a time division, a spatial division, or a hybrid division multiplexing scheme.

26. The network component of claim 23, further comprising:
a determinator configured to determine if the first channel feedback information is reliable, wherein the allocator is configured to allocate the first control channel in the first data region of the first subframe if the first channel feedback information is reliable.

27. The network component of claim 26, wherein the allocator is configured to allocate the first control channel in the first data region of the first subframe in accordance with a configuration by signaling from a higher layer if the first channel feedback information is not reliable, and wherein the transmitter is configured to transmit an information regarding the first control channel using a higher layer signaling to the first user equipment, and wherein the information comprises location of the first control channel in the first subframe.

28. The network component of claim 23, wherein the first channel feedback information comprises channel quality indicator for each subband in a group of subbands.

29. The network component of claim 28, wherein the allocator is configured to allocate the first control channel in accordance with a subband with a highest channel quality indicator.

30. The network component of claim 23,
wherein the receiver is configured to receive a second channel feedback information from a second user equipment, wherein the first channel feedback information designates a first subband as a subband with a highest channel quality indicator for the first user equipment, wherein the second channel feedback information designates the first subband as a subband with a highest channel quality indicator for the second user equipment;
wherein the allocator is configured to allocate a first resource block in the first subband in the data region of the subframe as a second control channel, wherein the allocator is configured to allocate a second resource block in the first subband as the first control channel; and
wherein the transmitter is configured to transmit the second control channel within the first subframe to the second user equipment.

31. The network component of claim 23, wherein the wireless communication is compliant with Long Term Evolution (LTE) release 11 or higher, wherein the first control channel is an Enhanced Physical Downlink Control Channel (E-PDCCH), wherein the data region is a region of a subframe allocated for data in LTE release 10, and wherein the allocator is configured to allocate the first control channel using a standard in accordance with LTE release 11 or higher.

32. A wireless device comprising:
a receiver configured to receive a first reference signal and to receive a subframe from a first base station, wherein the receiver is configured to receive a control channel within a data region of a subframe;
a first generator configured to generate a channel quality feedback information in accordance with the first reference signal;
a second generator configured to generate a first search space for control channel candidates, the second generator configured to generate the first search space in accordance with the channel quality feedback information, the first search space comprising potential location of a control channel in a data region of a received subframe; and
a transmitter configured to transmit the channel quality feedback information, wherein the transmitter is configured to receive the control channel allocated by the first base station as indicated by the channel quality feedback information.

33. The wireless device of claim 32, further comprising:
a detector configured to detect the control channel in the received subframe by searching the first search space.

34. The wireless device of claim 32, further comprising a detector configured to detect a first control channel in the received subframe by searching a second search space, wherein the second generator is configured to generate the second search space for control channel candidates, the second generator being configured to generate the second search space in accordance with higher layer signaling.

35. The wireless device of claim 32, further comprising a detector configured to detect a first control channel in the received subframe by searching the first search space and a second search space, wherein the second generator is configured to generate the second search space for control channel candidates, the second search space being generated in accordance with higher layer signaling.

36. The wireless device of claim 32, wherein the channel feedback information comprises channel quality indicator for each subband in a group of subbands.

37. The method of claim 15, wherein the channel feedback information comprises a location for a first control channel within a data region of a first subframe.

38. The wireless device of claim 32, wherein the channel quality feedback information includes a location of the control channel within the data region of the subframe.

* * * * *

UNITED STATES PATENT AND TRADEMARK OFFICE
CERTIFICATE OF CORRECTION

PATENT NO. : 8,780,863 B2
APPLICATION NO. : 13/286875
DATED : July 15, 2014
INVENTOR(S) : Qian Cheng et al.

Page 1 of 1

It is certified that error appears in the above-identified patent and that said Letters Patent is hereby corrected as shown below:

On the Title Page, item (75) Inventors, line 1, delete "Qiang Cheng" and insert --Qian Cheng--.

Signed and Sealed this
Ninth Day of December, 2014

Michelle K. Lee
*Deputy Director of the United States Patent and Trademark Office*